Aug. 7, 1951  C. L. MOYER  2,562,938
FIVE-KNIFE FOUR-STAGE BOOK TRIMMER
Filed March 22, 1948  14 Sheets-Sheet 1

Fig. 1.

INVENTOR
CHARLES L. MOYER, DECEASED,
CLIFFORD S. BASSETT, EXECUTOR
By: Lee J. Gary
Attorney Aug. 7, 1951             C. L. MOYER            2,562,938
FIVE-KNIFE FOUR-STAGE BOOK TRIMMER
Filed March 22, 1948                              14 Sheets-Sheet 3

INVENTOR
CHARLES L. MOYER, DECEASED,
CLIFFORD S. BASSETT, EXECUTOR

Aug. 7, 1951 C. L. MOYER 2,562,938
FIVE-KNIFE FOUR-STAGE BOOK TRIMMER
Filed March 22, 1948 14 Sheets-Sheet 5

Fig. 5

INVENTOR
CHARLES L. MOYER, DECEASED,
CLIFFORD S. BASSETT, EXECUTOR
By Lee J. Gary
Attorney

Aug. 7, 1951 — C. L. MOYER — 2,562,938
FIVE-KNIFE FOUR-STAGE BOOK TRIMMER
Filed March 22, 1948 — 14 Sheets-Sheet 12

INVENTOR
CHARLES L. MOYER, DECEASED.
CLIFFORD S. BASSETT, EXECUTOR
By Lee J. Gary
Attorney Aug. 7, 1951  C. L. MOYER  2,562,938
FIVE-KNIFE FOUR-STAGE BOOK TRIMMER
Filed March 22, 1948  14 Sheets-Sheet 14

INVENTOR
CHARLES L. MOYER, DECEASED,
CLIFFORD S. BASSETT, EXECUTOR
By Lee J. Gary
Attorney Patented Aug. 7, 1951

2,562,938

UNITED STATES PATENT OFFICE 2,562,938

FIVE-KNIFE FOUR-STAGE BOOK TRIMMER

Charles L. Moyer, deceased, late of Chicago, Ill., by Clifford S. Bassett, executor, Chicago, Ill., assignor to C. L. Moyer Company, Chicago, Ill., a corporation of Illinois Application March 22, 1948, Serial No. 16,356

14 Claims. (Cl. 164—48)

This invention relates to improvements in book trimming machines adapted for use in trimming the head, foot and front edges of bound books, catalogs, pamphlets and the like. More particularly, this invention is concerned with the provision of a five-knife, four-stage book trimming machine adapted for use in trimming book units in which each unit comprises a plurality of printed sheets bound together to form two complete books when the unit is cut transversely intermediate its ends. During the trimming operation, each book unit is first delivered to the first stage of the machine to be trimmed along its front edge. The unit is then transferred to the second stage of the machine to be trimmed along its head and foot. In the third stage of the machine, the unit is cut in half to form two individual books, one of which does not require further trimming. In the fourth stage of the machine, the unfinished individual book is trimmed on one of its ends.

This invention further contemplates the provision of a four-stage book trimming machine embodying improved means for automatically transferring the book units from stage to stage throughout the several trimming operations.

This invention further contemplates the provision of improved stop means and aligning means for accurately arranging the book units in position to be trimmed throughout the several stages of the machine.

It is a further object of this invention to provide a book trimming machine in which the knives, stop members, and other operating parts may readily be adjusted to adapt the machine for use in trimming books of different sizes.

This invention further contemplates the provision of a book trimming machine in which a single knife carrier is provided for the several knives and is mounted for reciprocable movement upon a machine base or a frame having a plurality of cutting blocks secured thereon to coact with the knives in trimming the book units. To control the cutting stroke of the knife carrier, it is brought into engagement with the machine base upon contact of the knives against their respective cutting blocks. The knife edges and cutting blocks are thereby provided with a relatively long service life as the cutting stroke is always terminated immediately upon contact of the knife edges against the cutting blocks.

This invention embodies other novel features, details of construction and arrangement of parts which are hereinafter set forth in the specification and claims, and illustrated in the accompanying drawings wherein:

Fig. 14 is a detail sectional view taken along the line 14—14 of Fig. 12.

Machine base

Referring now to the drawings for a better understanding of this invention, the five-knife, four-stage book trimming machine is shown as comprising a flat top base 1 formed with side frame members 2 and 3, end frame members 4 and 6, and a top plate 7 which are secured or bolted together to form a relatively strong, rigid supporting structure for the other parts of the machine.

In the construction of the machine, the frame members and top plate are assembled first, then the upper surface of the top plate is accurately machined to provide a smooth finished work face to receive and support the parts of the machine mounted thereon. It has been found that a machine base constructed in this manner facilitates the construction and improves the operation of the machine, as accurate measurements may be taken from the top plate work face to all other parts of the machine.

Knife carrier

A knife carrier 8 is guided for vertical reciprocable movement above the machine base 1 by means of a plurality of guide columns 9 having their lower ends bolted against the upper surface of the top plate 7 and their upper portions extending through bearings 11 provided on the knife carrier. The guide columns 9 are preferably formed round in cross section and have their upper ends reduced in diameter for snug engagement within apertures 12 formed in a cover plate 13, the inner end of the reduced portion terminating at an annular shoulder which engages the lower face of the cover plate. The cover plate is secured against upward displacement from the columns by means of cap screws 14 and washers 16.

Each column is formed with an abutment shoulder 17 which acts as a fixed stop to limit the downward movement of the knife carrier. This is an important feature of the present invention as the knives carried by the carrier are always brought to rest on their downward stroke at a predetermined fixed distance from the upper surface of the top plate 7 and cutting blocks mounted thereon.

Drive for knife carrier

A pair of crank shafts 18 and 19, journaled in suitable bearings provided on the side frame members 2 and 3, are formed with crank portions at their ends to receive the lower ends of connecting rods 21, the upper ends of the rods 21 being journaled on stud shafts provided on the sides of the knife carrier 8. Each of the connecting rods preferably comprises upper and lower bearing members 22 and 23, respectively, which are internally threaded to receive the threaded ends of their respective rod portions 24. The lengths of the connecting rods 21 are adjusted prior to operation of the machine to move the knife carrier 8 into contact with the abutment shoulders 17 which serve as stops to limit the downward movement of the knife carrier.

A pair of gears 26 and 27 are keyed to the crank shafts 18 and 19, respectively, for meshing engagement with a gear 28 keyed to cam shaft 29 which is journaled in suitable bearings provided on the side frame members 2 and 3. A gear 31 is keyed to a shaft 32, journaled in the side frame members 2 and 3, to drive the gear 28. A gear 33 is also keyed to the shaft 32 to be driven by a gear 34 keyed to a pulley shaft 36. A pulley 37 is keyed to the pulley shaft 36 to be driven by belts 38 from a motor 39.

Knife holders

A finished flat surface is formed on the bottom side of the knife carrier 8 to receive a plurality of knife holder guide plates 41, 42, 43, 44 and 45, the plates 41, 44 and 45 being secured in fixed position by means of cap screws 46, and the plates 42 and 43 being adjustable transversely of the knife carrier by means of suitable adjustment screws 47. If desired, the guide plates 41, 44 and 45 may be formed with slots to receive their respective cap screws 46 to permit limited adjustment of the guide plates relative to the knife carrier.

Referring now more particularly to Figs. 1, 2, 4, 6, 17 and 18 in the drawings, the first stage knife holder, indicated generally at A, is shown as comprising a body member 48 formed along its upper edge with a dovetail portion 49 for reciprocable movement in a dovetail groove 51 formed in the guide plate 41. An adapter 52 is secured to one side of the body member 48, by means of a key portion 53 and cap screws 54, to support a knife 56. As the other knife holders, indicated generally at B, C, D and E, are constructed and mounted for reciprocable movement in their respective guide plates 42, 43, 44 and 45 in the manner just described in connection with knife holder A, a further description of same is believed to be repetitious and unnecessary. As illustrated in Figs. 1, 2, 4, 6, 17 and 18, each of the knife holders A, B, C, D and E are adapted to support knives 56, 57, 58, 59 and 61, respectively, the knives being adjustably positioned upon their respective adapters by means of adjustment screws 62 and locking screws 63.

A connecting link 64 is journaled at its one end on a bearing pin 65 provided on the body member 48 of the knife holder A, and is journaled at its other end on a bearing pin 66 secured to the cover plate 13. During reciprocable movement of the knife carrier 8, it will be noted that the connecting link 64 is pivoted about its bearing pin 66 and thus imparts reciprocable movement to the knife holder A to effect a draw-cut shearing action by the knife 56 during its cutting stroke.

A bearing pin 67 extends transversely through apertures formed in the knife holders B and C to engage the lower ends of a pair of connecting links 68—68 which have their upper ends journaled on pivot pins 69—69 secured to the cover plate 13. A bearing pin 71 extends transversely through an aperture formed in the knife holder D to engage the lower ends of a pair of connecting links 72—72 which have their upper ends journaled on pivot pins 73—73 secured to the cover plate 13. A bearing pin 74 extends transversely through an aperture formed in the knife holder E to engage the lower ends of connecting links 75—75 which have their upper ends journaled on pivot pins 76—76. When the knife carrier 8 is reciprocated vertically, the connecting links 68—68, 72—72 and 75—75 act to impart draw-cut reciprocable movement to their respective knife holders relative to the knife carrier 8.

Figure 17:
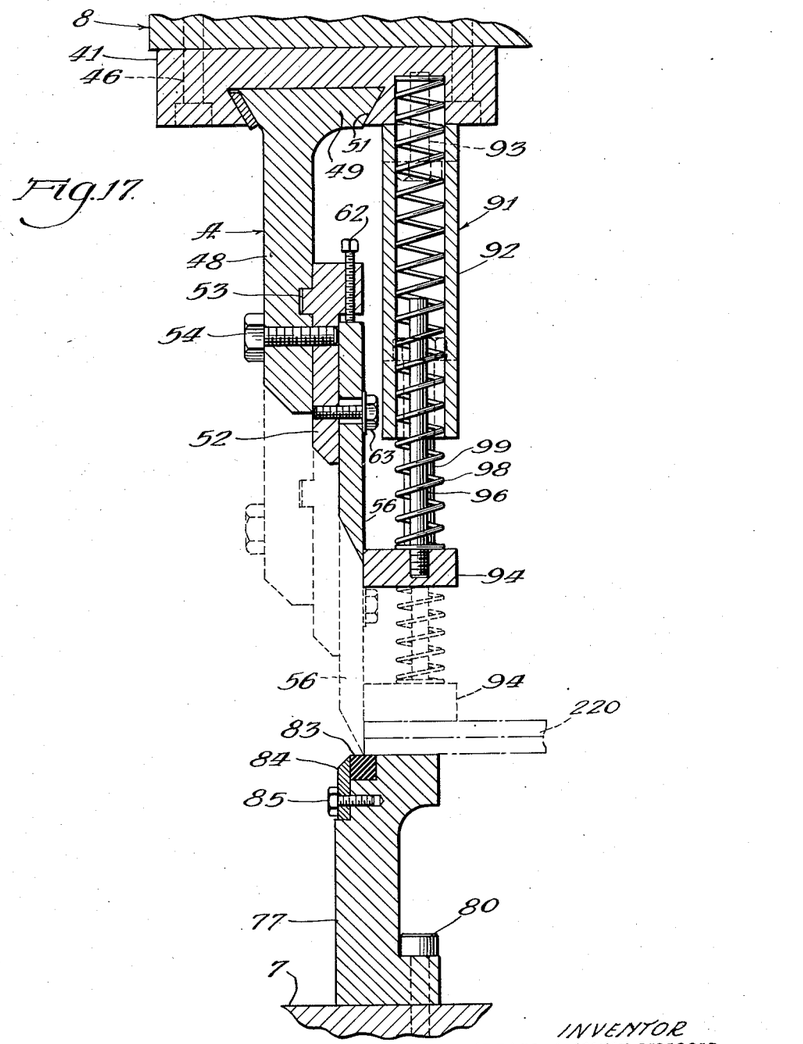
Fig. 17 is a fragmentary sectional view taken along the line 17—17 of Fig. 2.
Figures 18, 19:
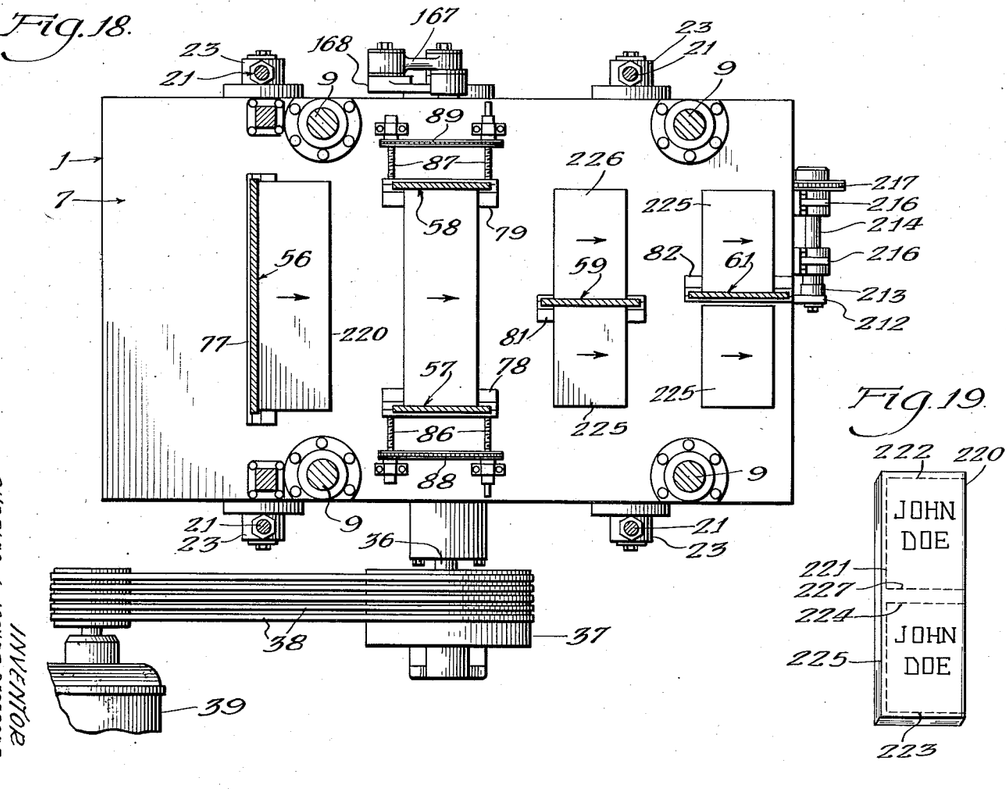
Fig. 18 is a schematic view illustrating the four stages employed in trimming each book unit.
Fig. 19 is a perspective view illustrating a book unit and the method of trimming same to form two individual trimmed books.

As illustrated in Figs. 17 and 18, cutting tables 77, 78, 79, 81 and 82 are secured by suitable screws 80 to the upper surface of the top plate 7 and below their respective knives 56, 57, 58, 59 and 61. A cutting block 83, preferably formed of hard fibrous material, is secured in position on each cutting table by means of a clamping plate 84 and cap screws 85. The cutting blocks 83 are preferably formed square in cross-section to provide four similar surfaces which may be employed to coact with the knives in trimming books. The adjustment screws 86—86 and 87—87 are journaled in suitable thrust bearings provided on the top plate 7 to move their respective cutting tables 78 and 79 toward or away from each other. Each set of adjustment screws 86—86 and 87—87 is preferably connected for common rotational movement by means of sprockets and sprocket chains 88 and 89, respectively, to thus maintain the cutting tables 78 and 79 in parallel alignment at all times.

Hold-down device

As illustrated in Fig. 17, a hold-down device 91 is mounted on each of the knife holder guide plates 41, 42, 43, 44 and 45 to coact with their respective cutting tables 77, 78, 79, 81 and 82 to hold books in position during the cutting stroke of their respective knives 56, 57, 58, 59 and 61. The hold-down device is of well known construction and comprises a frame 92 secured to a guide plate by means of cap screws 93. A hold-down bar 94 is provided with guide rods 96 which extend upwardly through cylindrical bores 97 formed in the frame 92. Suitable compression springs 98 are interposed between the frame 92 and bar 94 to yieldably resist movement of the bar toward the frame, and stop screws 99 are provided on the bar for engagement with the frame to limit the movement of the bar downwardly away from the frame.

First stage book feed mechanism

The books to be trimmed are first delivered from a binding machine, or from a hopper, to the trimming machine by any suitable book transfer mechanism 100, such as the one described and claimed in co-pending application, Serial No. 793,076, filed December 22, 1947, embodying a continuously driven endless conveyor 101 provided with push lugs 102 at equally spaced intervals, and a pair of reciprocating racks (not shown) provided with push lugs 103 which serve to transfer books from the end of the conveyor belt 101 into position to be trimmed along their front edges by the first stage trimming knife 56. The book transfer mechanism 100 is driven in timed relation with the book trimming machine, by means of a chain drive 100a, to deliver one book, or a stack of two or more books, to the first stage of the trimming machine during each operating cycle of the latter.

Book transfer mechanism

Referring now more particularly to Figs. 4 and 11 to 16, inclusive, a book transfer mechanism, generally indicated at 104, is shown as comprising a pair of opposing jaws 106—106a mounted on jaw mechanisms 107—107a. As the jaw mechanisms 107 and 107a are similar in construction and operation, the following description of mechanism 107 also applies to mechanism 107a, with corresponding numbers followed by the letter "a" being applied to corresponding parts.

The jaw mechanism 107 is shown as comprising a carriage 108 formed with two parallel bores to receive a pair of guide rods 109 and 111, the ends of the guide rod 109 being secured to the free ends of pivot arms 112—112, and the ends of the guide rod 111 being secured to the free ends of pivot arms 113—113. A jaw bracket 114 is secured to the carriage 108 and provided with a bore to receive the shank portion of the jaw 106 which is secured in adjusted position by a set screw 116. The pivot arms 112—112 are journaled on pivot pins 117—117 mounted in bearing members 118—118 secured to the top plate 7, and pivot arms 113—113 are secured to opposite ends of a shaft 119 journaled in the bearing members 118—118.

The jaws 106 and 106a are moved toward each other for clamping engagement against the head and front of a book by means of a cam 121 secured to the shaft 18. The cam 121 is formed with a cam track 122 to receive a roller 123 mounted in an actuating arm 124, the free end of the arm 124 being connected to the end of a lever 126 secured to a shaft 127 which is journaled in bearings 128 secured to the bottom of the top plate 7. A pair of levers 129—129a are secured to opposite ends of the shaft 127 and have their free ends connected to connecting links 131—131a which, in turn, are connected to the free ends of levers 132—132a. The levers 132—132a are keyed to the shafts 119—119a.

The jaw supporting carriages 108—108a are movable back and forth along their respective guide rods 109—111 and 109a—111a by means of a cam 133 which is keyed to the shaft 18 and formed with a cam track 134 to receive a roller 136 mounted on an actuating arm 137. The free end of the arm 137 is connected to the free end of a lever 138 which is secured to a shaft 139 journaled in bearings 141—141. A pair of carriage actuating levers 142—142a are secured to opposite ends of the shaft 139 and have their free ends offset at 143—143a for engagement in slide bearings 144—144a secured in the carriages 108—108a, respectively.

Book feed mechanism

The books travel through the trimming machine along flat plates 146 supported in spaced parallel relation above the top plate 7 by means of a plurality of posts 147. The book transfer mechanism 104 acts to move books from the first stage of the machine into position to be engaged by a first set of feed fingers 148—148 provided on their respective feed racks 149—149, as illustrated in Figs. 4 to 9 in the drawings.

The feed racks 149—149 are mounted in spaced parallel relation for common reciprocable movement in guide frames 151—151 which are pivotally supported upon the upper ends of a plurality of connecting links 152, the lower ends of the links being journaled on suitable bearings 153 secured to the top plate 7. The feed racks are provided with three additional sets of feed fingers, indicated at 148a—148a, 148b—148b and 148c—148c, which act, one set after the other, to move books through the trimming machine along the flat guide plates 146.

The guide frames 151—151 are raised and lowered simultaneously, to alternately position the feed fingers above and below the guide plates 146, by means of a cam 154 keyed to the shaft 29. The cam 154 is formed with a track 156 to receive a roller 157 journaled on an actuating arm 158, the lower end of said arm being bifurcated to straddle the shaft 29. A crossbar 159 is secured to the upper end of the actuating arm 158, the ends of the crossbar being pivotally connected to the lower ends of a pair of supporting arms 161—161. The upper ends of the supporting arms 161—161 are keyed to cross shafts 162—162 which in turn are keyed to the lower ends of two sets of upper supporting arms 163—163 and 164—164. The upper ends of the arms 163—163 and 164—164 are pivotally connected to the ends of the guide frames 151—151.

The feed racks 149—149 are reciprocated within their respective guide frames 151—151 by means of a crank 166 (see Fig. 6) formed on the end of the shaft 29 to engage the lower end of a connecting rod 167, the upper end of the connecting rod being journaled at the free end of a crank arm 168 keyed to a shaft 169. The shaft 169 is journaled in suitable bearings 171 and has a gear segment 172 keyed thereon for meshing engagement with a gear 173. The gear 173 is keyed to a shaft 174 which is journaled in suitable bearings provided on the top plate 7. The gear 173 meshes with a gear 176 journaled on a shaft 177 supported at its ends on a pair of bearings 178—178. The gear 176 meshes with a driven pinion 179 keyed to a shaft 181, the ends of the shaft being journaled in suitable bearings provided in the guide frames 151—151. A pair of rack gears 182—182 (see Fig. 7) are keyed to opposite ends of the shaft 181 for meshing engagement with the feed racks 149—149.

Stop mechanism

As illustrated in Figs. 4 to 9, inclusive, the book stop mechanism is shown as comprising a pair of stop bars 183—183 which are arranged in spaced parallel relation above the top plate 7 to coact with the feed mechanism in positioning the books to be trimmed throughout the several stages of the trimming machine. The stop bars 183—183 are mounted on the upper ends of two sets of connecting links 184—184 and 186—186. The lower ends of the connecting links 184—184 are keyed to a shaft 187, and the lower ends of the connecting links 186—186 are journaled in bearings 188—188 provided on the top plate 7.

The shaft 187 is journaled in bearings 189—189 and has a lever 191 keyed thereto for engagement by an actuating arm 192. The lower end of the actuating arm 192 is provided with a roller 193 for engagement in a cam track 194 formed in a cam 196 keyed to the shaft 29. The lower end of the arm 192 is bifurcated to straddle the shaft 29. The stop bars 183—183 carry four sets of stop fingers indicated at 198—198, 198a—198a, 198b—198b and 198c—198c, the stop fingers being mounted for limited adjustment longitudinally along their respective bars.

As the books travel along the plates 146, they are frictionally engaged along their top sides by a pair of hold-down plates 201—201. The hold-down plates 201—201 are suported at the end of adjustable bolts 202, and compression springs 203 are provided on each of the bolts to yieldably resist upward movement of the hold-down plates.

Book stacking mechanism

Figure 1:
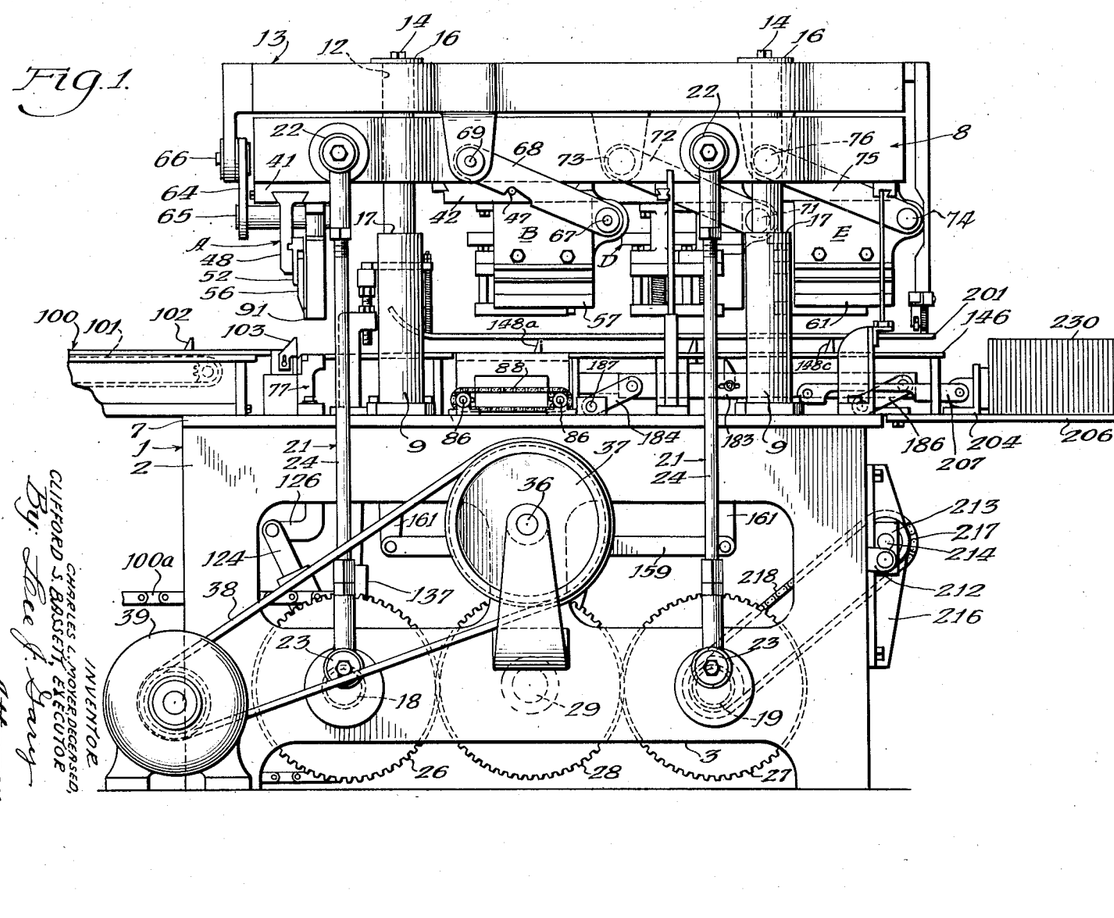
Fig. 1 is a side elevational view illustrating a five-knife, four-stage trimming machine embodying features of this invention.
Figure 2:
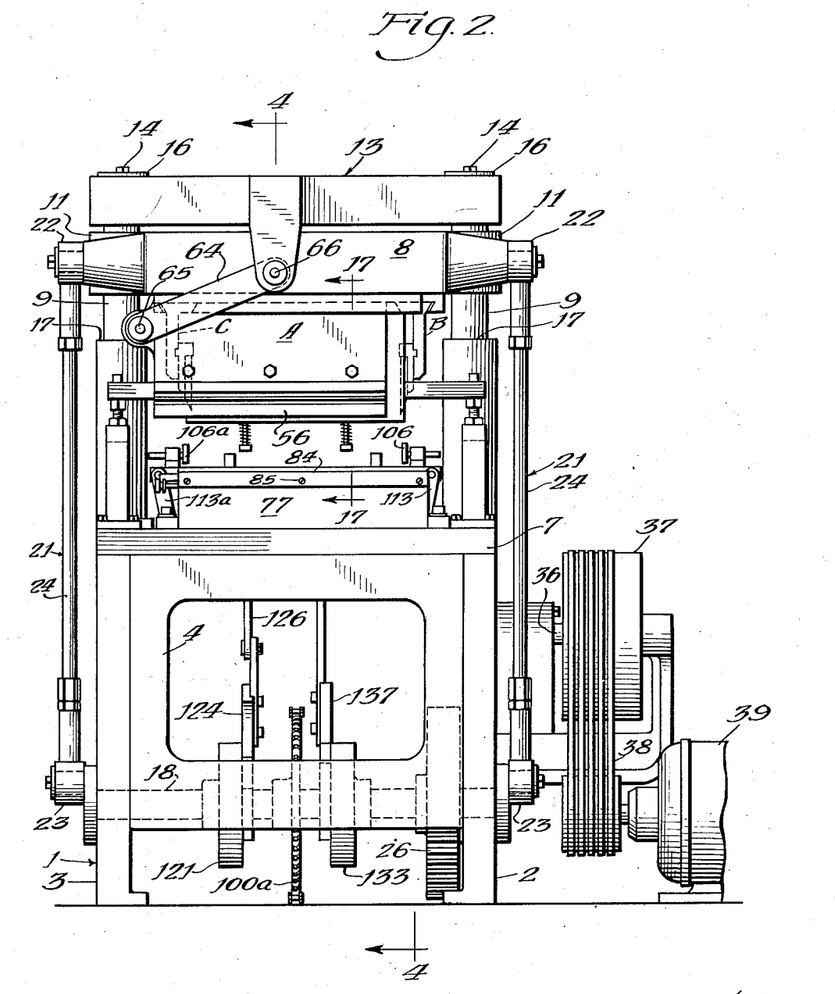
Fig. 2 is a front elevational view of same.
Figure 3:
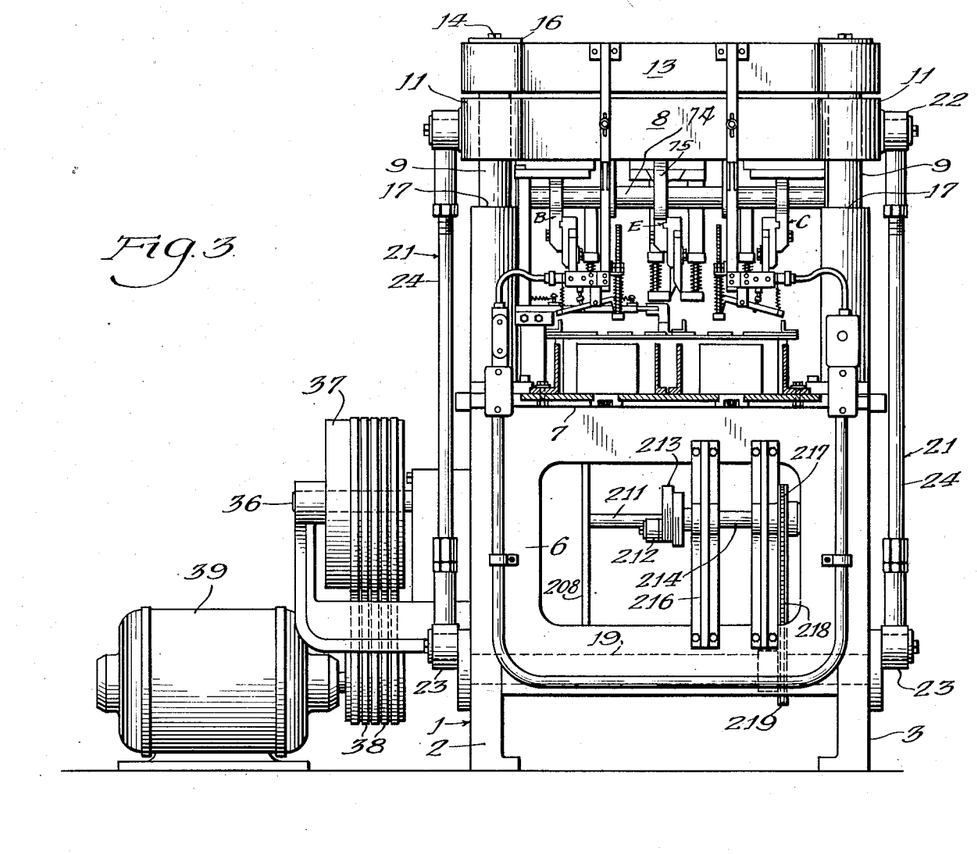
Fig. 3 is a rear elevational view of same.
Figure 4:
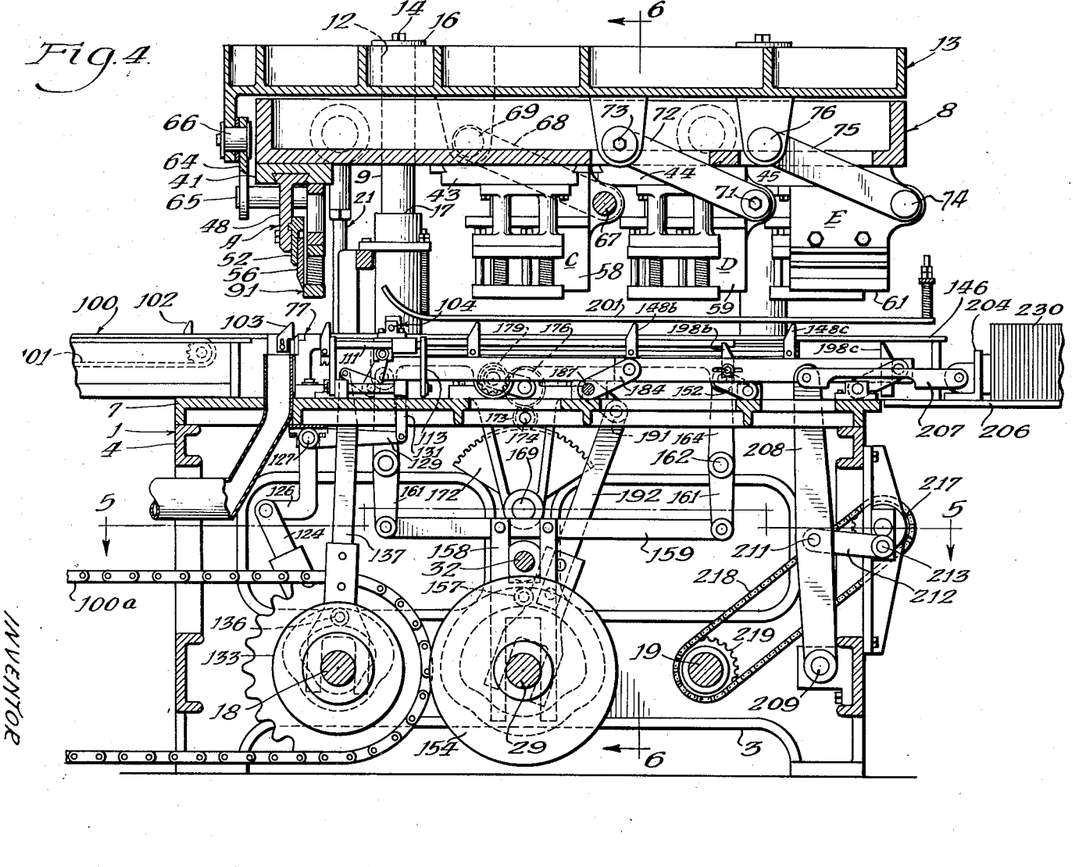
Fig. 4 is a longitudinal sectional view taken along the line 4—4 of Fig. 2.
Figure 5:
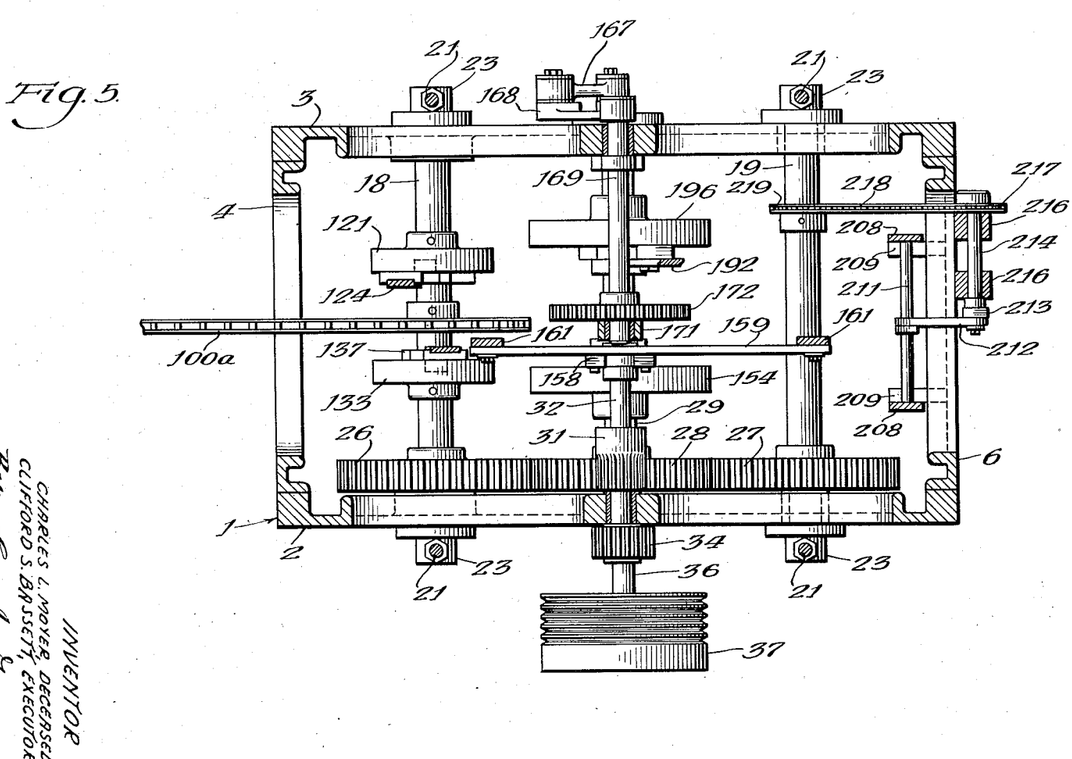
Fig. 5 is a sectional view taken along the line 5—5 of Fig. 4.
Figure 6:
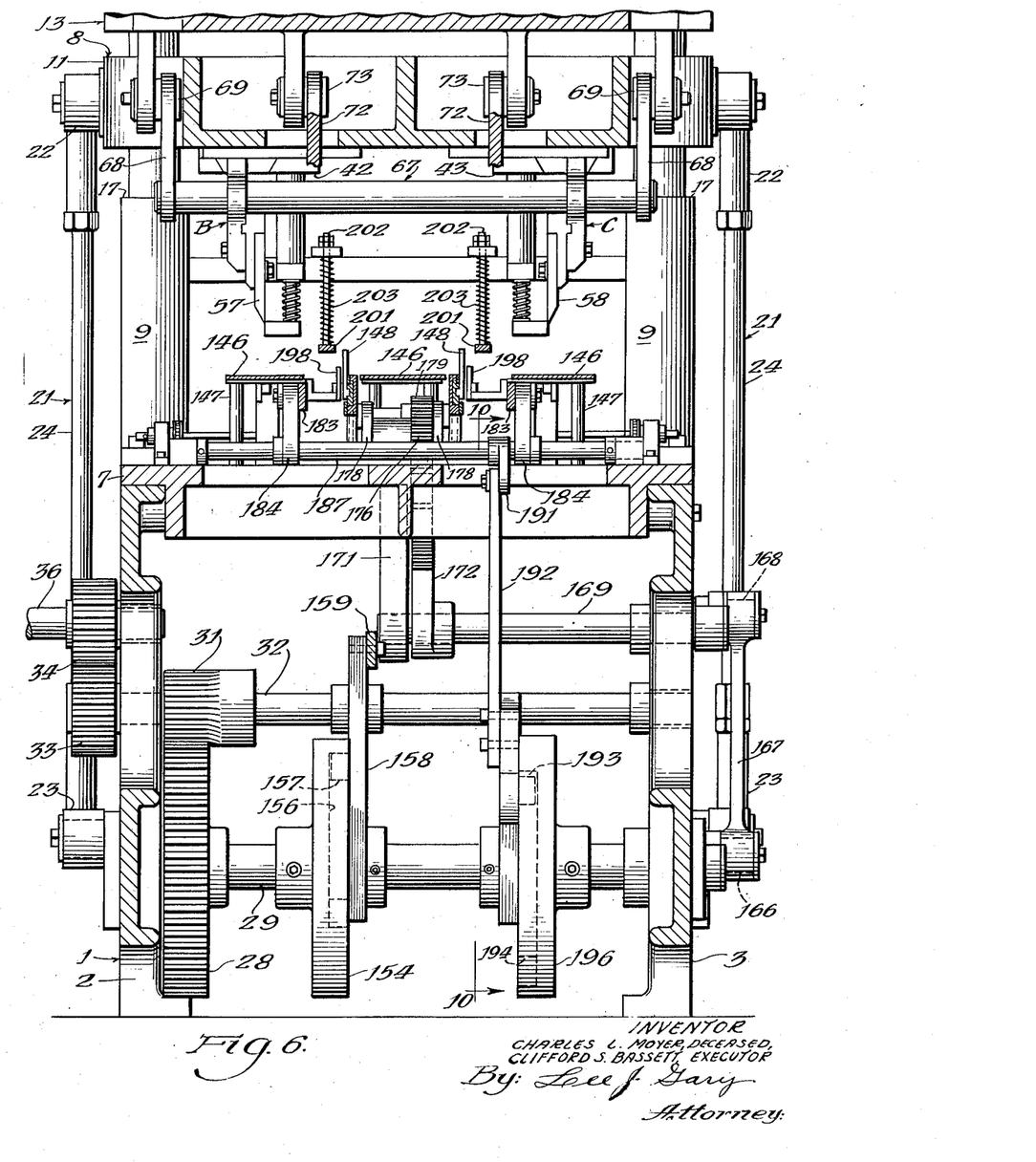
Fig. 6 is a transverse sectional view taken along the line 6—6 of Fig. 4.
Figure 7:
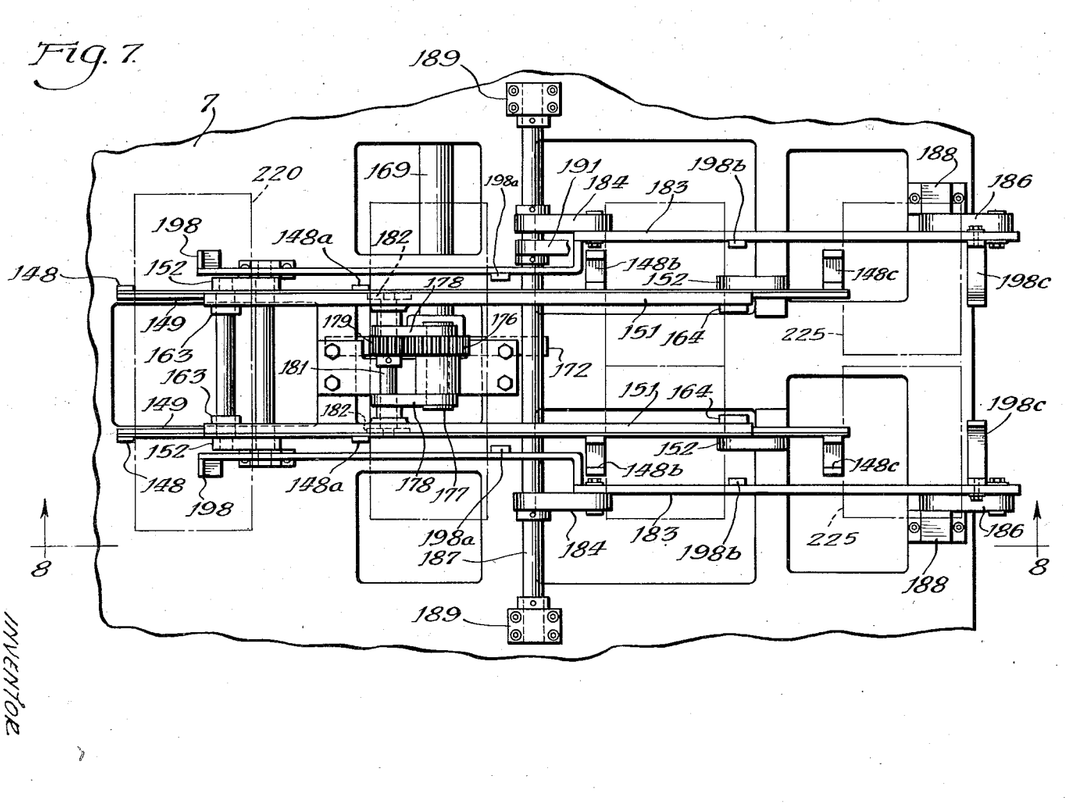
Fig. 7 is a fragmentary top plan view illustrating the feed mechanism and stop mechanism employed for controlling the movement of book units through the machine.
Figures 8, 9:
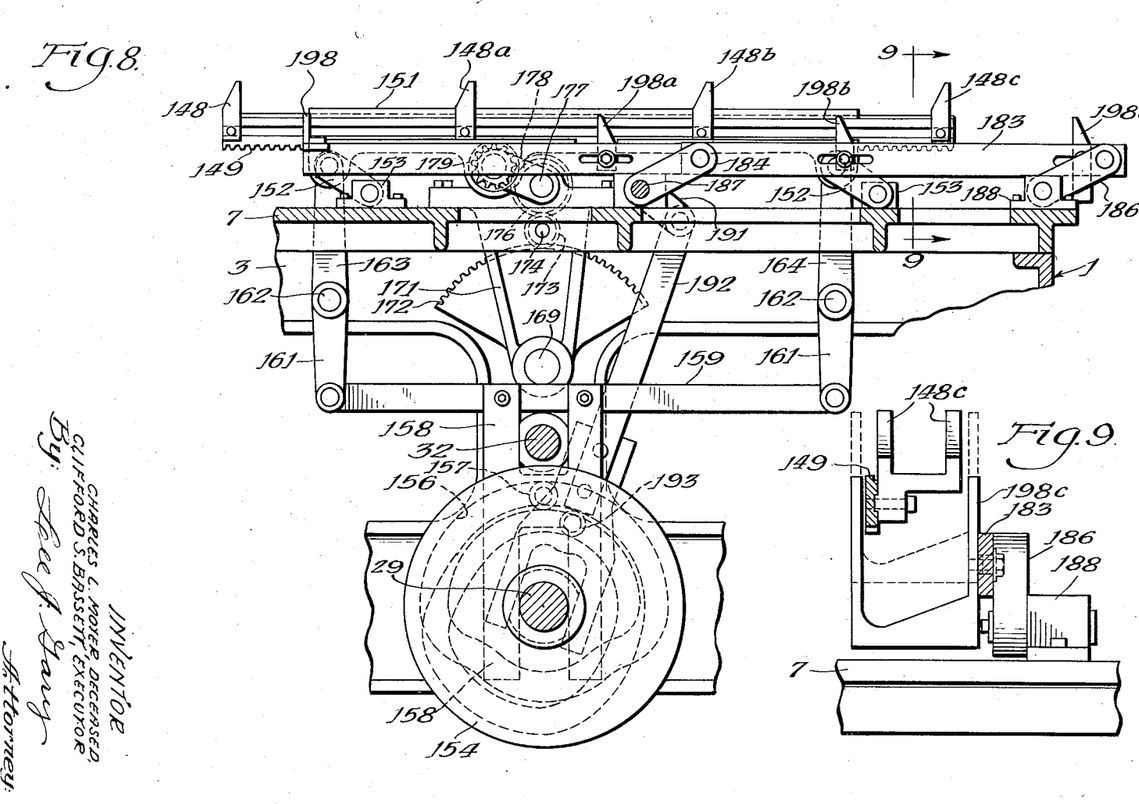
Fig. 8 is a fragmentary sectional view taken along the line 8—8 of Fig. 7.
Fig. 9 is a detail sectional view taken along the line 9—9 of Fig. 8.
Figure 10:
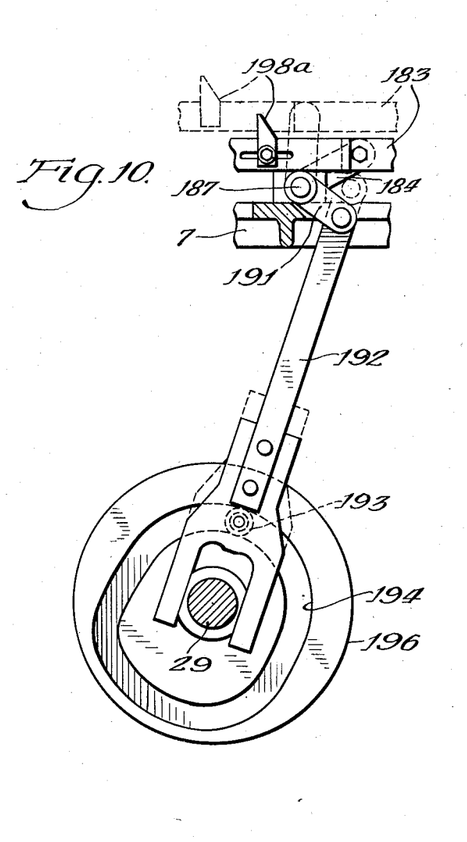
Fig. 10 is a detail sectional view taken along the line 10—10 of Fig. 6.
Figure 11:
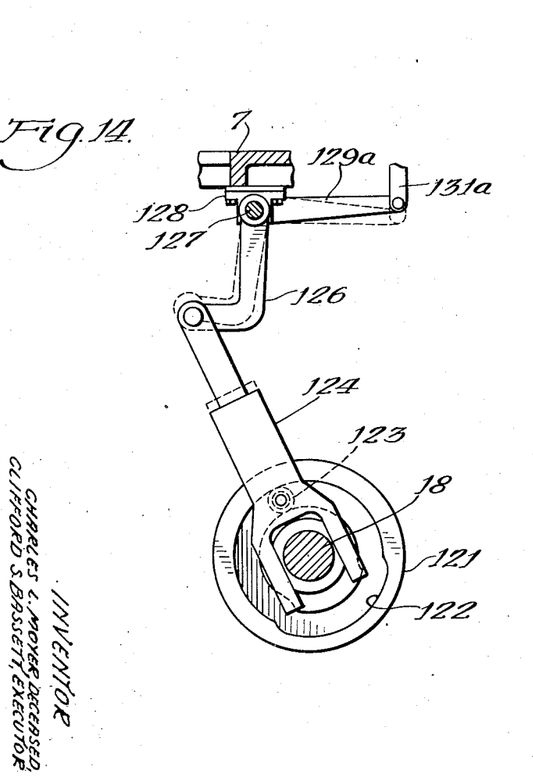
Fig. 11 is a fragmentary top plan view illustrating the feed and alignment mechanism employed for the first stage of the machine.
Figure 12:
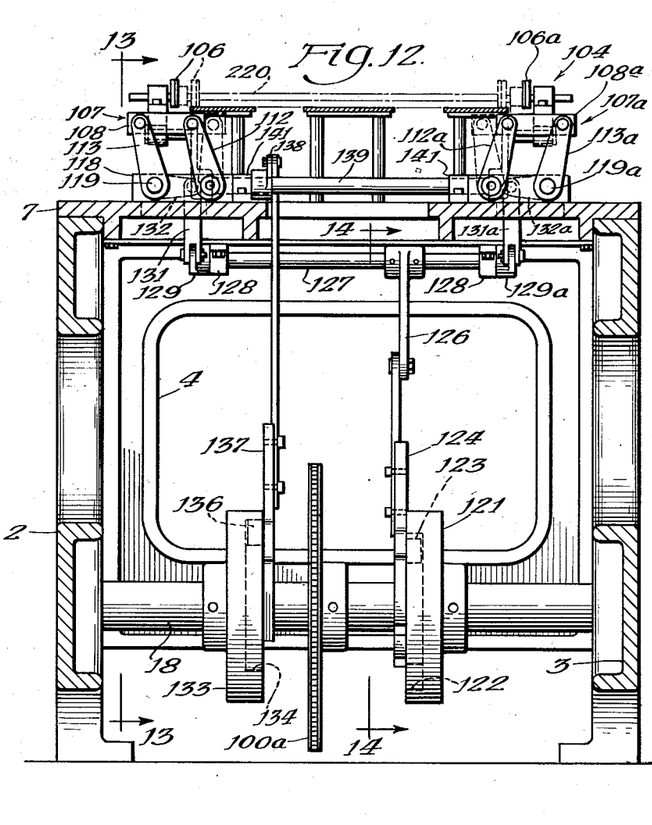
Fig. 12 is a transverse sectional view taken along the line 12—12 of Fig. 11.
Figure 13:
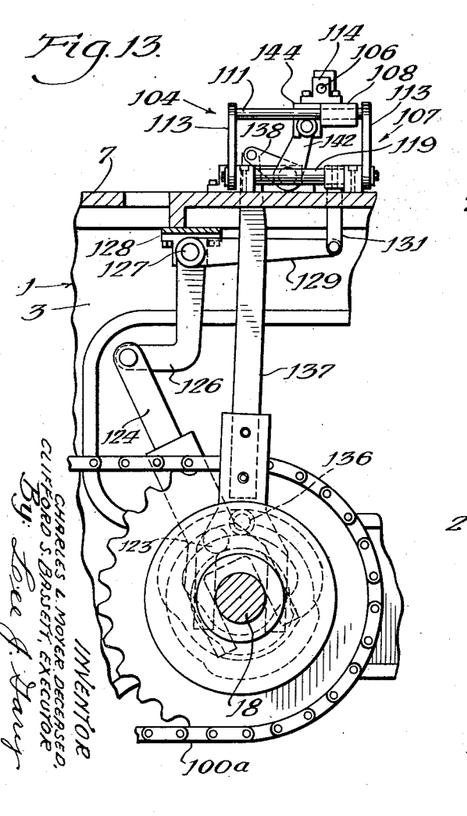
Fig. 13 is a fragmentary sectional view taken along the line 13—13 of Fig. 12.
Figure 15:
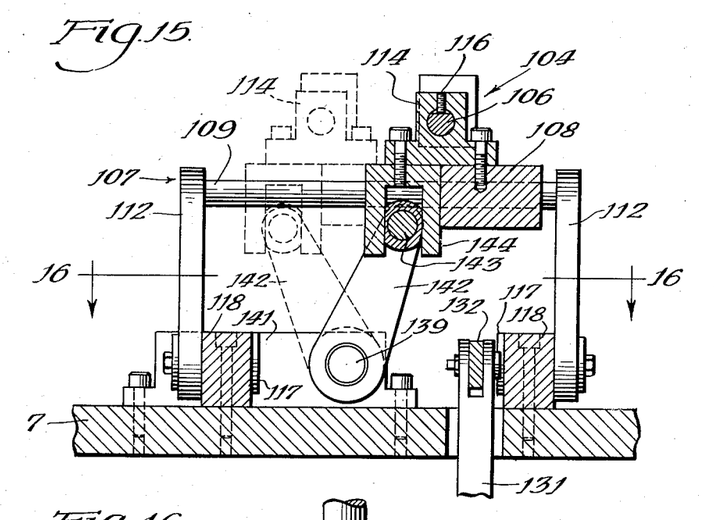
Fig. 15 is a fragmentary sectional view taken along the line 15—15 of Fig. 11.
Figure 16:
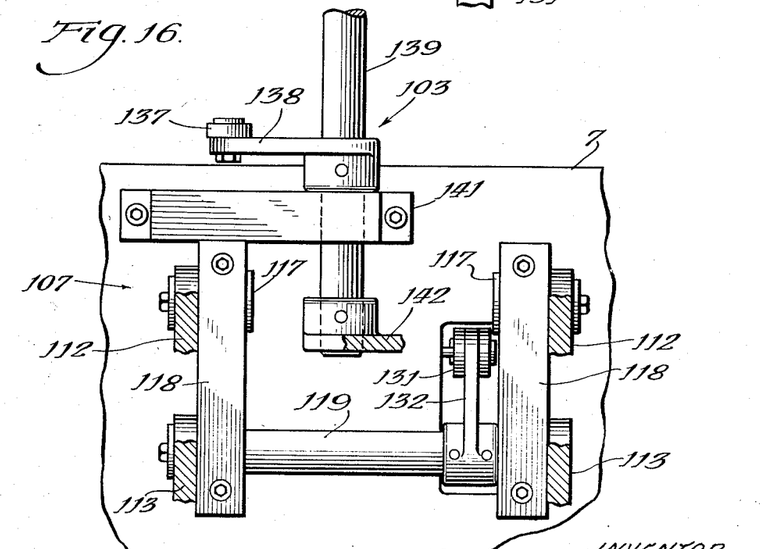
Fig. 16 is a fragmentary sectional view taken along the line 16—16 of Fig. 15.

Referring now to Figs. 4 and 5 in the drawings, the book stacking mechanism is shown as comprising a pusher 204 disposed for reciprocable movement along a receiving plate 206. The push plate 204 is connected to the outer ends of a pair of connecting links 207—207 which have their inner ends pivotally connected to the upper ends of a pair of lever arms 208—208. The lower ends of the levers 208—208 are journaled in suitable bearings 209—209 provided on the end frame member 6. A shaft 211 is secured at its ends in the levers 208—208 to engage one end of a connecting link 212, the other end of the connecting link being engaged by a crank arm 213 provided on a shaft 214. The shaft 214 is journaled in bearings 216—216 secured to the end frame 6, and a sprocket 217 is keyed to the shaft 214 to receive a sprocket chain 218. The sprocket chain 218 extends around a driving sprocket 219 keyed to the shaft 19.

Operation

The five-knife four-stage trimming machine thus described and illustrated in the drawings is particularly adapted for use in trimming books printed and bound in duplicate, as illustrated in Fig. 19. As illustrated in Fig. 18, the duplicate book 220 is first trimmed along its front edge 221 by means of the first-stage trimming knife 56. In the second stage, the book 220 is trimmed along its head and foot 222 and 223, respectively, by means of the knives 58 and 57. In the third stage of the machine, the double book 220 is cut transversely intermediate its ends along the line 224 by means of the knife 59 to form one completely trimmed book 225 and one incompletely trimmed book 226. In the fourth stage of the machine, the incompletely trimmed book is trimmed along the line 227 by means of the knife 61 to complete the trimming operation of the double book 220.

The double books 220 are delivered to the book trimming machine by means of the book feed mechanism 100 comprising an endless conveyor 101 and push lugs 103 mounted for reciprocable movement. The book feed mechanism 100 is shown and described in detail in copending patent application, Serial No. 793,076, filed December 22, 1947. The knife carrier 8 is adapted to be reciprocated in a vertical plane by means of the crank shafts 18 and 19 acting through their respective connecting rods 21, and one book or stack of books is delivered to the first stage of the trimming machine during each cycle of operation of the knife carrier 8.

In the first stage of the trimming machine, the double book 220 is held in position against the cutting table 77 by means of the hold-down mechanism 91 while the knife 56 trims the front edge 221 of the book. The head and foot of the book 220 is then engaged between the inwardly moving jaws 106 and 106a by means of the cam 121 which acts through the actuating arm 124, lever 126, shaft 127, levers 129 and 129a, connecting 131 and 131a, levers 132 and 132a, shafts 119 and 119a, levers 113 and 113a. After the jaws 106 and 106a have engaged the head and foot of the double book, the jaw supporting carriages 108 and 108a are moved toward the second stage of the machine, along their respective guide rods, by means of the cam 133, actuating arm 137, lever 138, shaft 139 and levers 142 and 142a. When the carriages 108 and 108a reach the end of their stroke, the jaws 106 and 106a move outwardly to release the double book and their carriages 108 and 108a then return to their first position adjacent the first-stage cutting table 77.

After the book 220 has been released by the jaws 106 and 106a of the transfer mechanism 104, it is engaged along its trimmed front edge by the feed fingers 148—148 provided on the feed racks 149—149. The feed racks 149—149 are reciprocated within their respective guide frames 151—151 by means of the crank 166 which acts through the connecting rod 167, crank arm 168, shaft 169, gear segment 172 and gears 173, 176 and 179, and rack pinions 182—182. During movement of the feed racks 149—149 toward the rear of the machine, they are disposed in their elevated position. During movement of the feed racks toward the front of the machine, they are disposed in their lower poistion to permit their respective feed fingers 148—148, etc., to pass beneath the books positioned upon the guide plates 146. The guide frames 151—151 and their respective feed racks are alternately raised and lowered by means of the cam 154 which acts through the actuating arm 158, crossbar 159, supporting arms 161—161, cross rods 162—162 and supporting arms 163—163 and 164—164. During reciprocable movement of the feed racks 149, the feed fingers 148—148, 148a—148a, etc., act to progressively advance books from stage to stage for each of the several trimming operations.

As the books to be trimmed are advanced through the machine by the feed fingers provided on the feed racks 149—149, they are brought to rest at each of the four stages of the machine by means of stop fingers 198—198, 198a—198a, 198b—198b and 198c—198c provided on the stop bars 183—183. After each cutting stroke of the knife carrier 8, the stop bars 183—183 are moved to their lower position to permit books to pass rearwardly over the tops of the stop fingers. The stop bars 183—183 are alternately raised and lowered by means of a cam 196 acting through an actuating arm 192, lever 191, shaft 187 and levers 184—184.

After a double book 220 has been trimmed and cut transversely to form two completely trimmed books, the finished books are delivered onto the stacking table 206 by means of the feed fingers 148c—148c. As the finished books fall from the guide plates 146 onto the stacking table 206, the pusher 204 is disposed away from the stack of books 230 and toward the front of the machine. The pusher 204 is reciprocated into and out of engagement with the stack of books 230 during each cycle of operation of the knife carrier 8. The pusher 204 is actuated from the shaft 19 through sprocket chain 218, shaft 214, crank 213, connecting link 212, levers 208—208 and connecting links 207—207.

While this invention has been shown in but one form, it is obvious to those skilled in the art that it is not so limited but is susceptible of various changes and modifications without departing from the spirit and scope of the claimed invention.

What is claimed is:

1. In a book trimming machine, a base, book supporting means provided on said base, a knife carrier mounted for vertical reciprocable movement about said base, means to actuate said knife carrier, five knives carried by said knife carrier, said knives being progressively arranged in cutting stages to trim a double book to form two individual books trimmed along their head, foot and front edges, one knife being disposed to trim a double book along its front edge, a pair of knives being arranged in spaced parallel relation to trim the head and foot of the double book, another knife being disposed to cut the double book transversely intermediate its ends to form two individual books, and a fifth knife disposed to trim the end of one of said individual books.

2. In a book trimming machine, a base, book supporting means provided on said base, a knife carrier mounted for vertical reciprocable movement above said base, means to actuate said knife carrier, five knives carried by said knife carrier, said knives being arranged in cutting stages to trim a double book to form two individual books trimmed along their head, foot and front edges, a first stage knife being disposed to trim a double book along its front edge, a pair of second stage knives being arranged in spaced parallel relation to trim the head and foot of the double book, a third stage knife being disposed to cut the double book transversely intermediate its ends to form two individual books, a fourth stage knife being disposed to trim the end of one of said individual books.

3. In a book trimming machine, a base, book supporting means provided on said base, a knife carrier mounted for vertical reciprocable movement above said base, means to actuate said knife carrier, five knives carried by said knife carrier, said knives being arranged in cutting stages to trim a double book to form two individual books trimmed along their head, foot and front edges, a first stage knife being disposed to trim a double book along its front edge, a pair of second stage knives being arranged in spaced parallel relation to trim the head and foot of the double book, a third stage knife being disposed to cut the double book transversely intermediate its ends to form two individual books, a fourth stage knife being disposed to trim the end of one of said individual books, and means including a pair of opposing jaws to engage the head and foot of a double book and to move the latter rearwardly from the first cutting stage to the second cutting stage.

4. In a book trimming machine, a base, book supporting means provided on said base, a knife carrier mounted for vertical reciprocable movement above said base, means to actuate said knife carrier, five knives carried by said knife carrier, said knives being arranged in cutting stages to trim a double book to form two individual books trimmed along their head, foot and front edges, a first stage knife being disposed to trim a double book along its front edge, a pair of second stage knives being arranged in spaced parallel relation to trim the head and foot of the double book, a third stage knife being disposed to cut the double book transversely intermediate its ends to form two individual books, a fourth stage knife being disposed to trim the end of one of said individual books, means including a pair of opposing jaws to engage the head and foot of a double book and to move the latter rearwardly from the first cutting stage to the second cutting stage, a pair of carriages to support said jaws for reciprocative movement, means to reciprocate said jaws, and means to move said carriages back and forth relative to said first stage knife.

5. In a book trimming machine, a base, book supporting means provided on said base, a knife carrier mounted for vertical reciprocative movement above said base, means to actuate said knife carrier, five knives carried by said knife carrier, said knives being progressively arranged in cutting stages to trim the head, foot, and front edge of a double book and then to divide the double book to form two individual books and then to trim the end of one of said individual books, and feed means to move books from stage-to-stage throughout the machine.

6. In a book trimming machine, a base, book supporting means provided on said base, a knife carrier mounted for vertical reciprocative movement above said base, means to actuate said knife carrier, five knives carried by said knife carrier, said knives being progressively arranged in cutting stages to trim the head, foot, and front edge of a double book and then to divide the double book to form two individual books and then to trim the end of one of said individual books, feed means to move books from stage-to-stage throughout the machine, and stop fingers provided at each cutting stage of the machine to coact with said feed means to arrange books in position to be trimmed.

7. In a book trimming machine, a base, book supporting means provided on said base, a knife carrier mounted for vertical reciprocable movement above said base, means to actuate said knife carrier, five knives carried by said knife carrier, said knives being progressively arranged in cutting stages to trim a double book to form two individual books trimmed along their head, foot and front edges, feed means to move books from stage to stage through the machine, said feed means including reciprocable racks, means to reciprocate said racks, and means to move said racks up and down relative to said book supporting means.

8. In a book trimming machine, a base, book supporting means provided on said base, a knife carrier mounted for vertical reciprocable movement above said base, means to actuate said knife carrier, five knives carried by said knife carrier, said knives being progressively arranged in cutting stages to trim a double book to form two individual books trimmed along their head, foot and front edges, feed means to move books from stage to stage through the machine, stop fingers provided at each stage of the machine to coact with said feed means to arrange books in position to be trimmed, and means to move said stop fingers into and out of engagement with books moving along said book supporting means.

9. In a book trimming machine, a base, book supporting means provided on said base, a knife carrier mounted for vertical reciprocable movement above said base, means to actuate said knife carrier, five knives carried by said knife carrier, said knives being progressively arranged in cutting stages to trim a double book to form two individual books trimmed along their head, foot and front edges, feed means to move books from stage to stage through the machine, said feed means including reciprocable racks, means to reciprocate said racks, means to move said racks up and down relative to said book supporting means, stop fingers provided at each stage of the machine to coact with said feed means to arrange books in position to be trimmed, and means to move said stop fingers into and out of engagement with books moving along said book supporting means.

10. In a book trimming machine, a base, a knife carrier mounted on said base for vertical reciprocative movement, means to actuate said knife carrier, guide plates provided on said base to support books, feed means to move books along said guide plates, five knives carried by said knife carrier, said knives being arranged progressively and in spaced relation along the line of travel of the books to define a plurality of cutting stages to trim and divide a double book whereby the double book is progressively trimmed and divided to produce two individual completely trimmed books, and stop means coacting with said feed means to position books for trimming at each of said stages.

11. In a book trimming machine, a base, a knife carrier mounted on said base for vertical reciprocable movement, guide plates provided on said base to support books, feed means to move books along said guide plates, at least five knives carried by said knife carrier, said knives being arranged in four stages to trim a double book, stop means coacting with said feed means to position books for trimming at each of the four stages, said knives including a first stage knife disposed in a plane normal to the line of travel of the books on said guide plates to trim the front edge of a double book.

12. In a book trimming machine, a base, a knife carrier mounted on said base for vertical reciprocable movement, means to actuate said carrier, guide plates provided on said base to support books, feed means to move books along said guide plates, five knives carried by said knife carrier, said knives being arranged in four cutting stages to trim a double book, stop means coacting with said feed means to position books for trimming at each of the four stages, said knives including a first stage knife disposed in a plane normal to the line of travel of the books on said guide plates to trim the front edge of a double book, a pair of second stage trimming knives arranged in spaced parallel relation in a plane normal to said first stage knife to trim the head and foot of a double book, a third stage knife disposed parallel to said second stage knives to cut a double book transversely intermediate its ends to form two individual books, a fourth stage knife disposed parallel to said third stage knife to trim one end of one of said individual books, and means to impart a draw-cut movement to said knives responsive to downward movement of said knife carrier.

13. In a book trimming machine, a base, a knife carrier mounted on said base for vertical reciprocable movement, means to actuate said knife carrier, guide plates provided on said base to support books, feed means to move books along said guide plates, five knives carried by said knife carrier, said knives being arranged in four cutting stages to trim a double book, stop means coacting with said feed means to position books for trimming at each of the four stages, said knives including a first stage knife disposed in a plane normal to the line of travel of the books on said guide plates to trim the front edge of a double book, a pair of second stage trimming knives arranged in spaced parallel relation in a plane normal to said first stage knife to trim the head and foot of a double book, a third stage knife disposed parallel to said second stage knives to cut a double book transversely intermediate its ends to form two individual books, a fourth stage knife disposed parallel to said third stage knife to trim one end of one of said individual books.

14. In a book trimming machine, a base, a knife carrier mounted on said base for vertical reciprocable movement, means to actuate said knife carrier, guide plates provided on said base to support books, feed means to move books along said guide plates, five knives carried by said knife carrier, said knives being arranged in four cutting stages to trim a double book, and stop means coacting with said feed means to position books for trimming at each of the four stages.

ISABELLE WIEDERRECHT,
*Administratrix de bonis non with Will Annexed of the Estate of Charles L. Moyer, Deceased.*

REFERENCES CITED

The following references are of record in the file of this patent:

UNITED STATES PATENTS

| Number | Name | Date |
|---|---|---|
| 490,877 | Lovell | Jan. 31, 1893 |
| 1,076,726 | Welch | Oct. 28, 1913 |
| 1,332,848 | Kent | Mar. 2, 1920 |
| 1,757,623 | Frazier | May 6, 1930 |
| 1,798,017 | Free | Mar. 24, 1931 |
| 1,982,380 | Pachter | Dec. 4, 1934 |
| 2,017,462 | Kleineberg | Oct. 15, 1935 |